(12) United States Patent
Lin et al.

(10) Patent No.: US 6,958,684 B2
(45) Date of Patent: Oct. 25, 2005

(54) RF TIRE PRESSURE SIGNAL SENSOR ANTENNA AND METHOD OF PACKAGING

(75) Inventors: Yingjie Lin, El Paso, TX (US); Manuel S Sanchez, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 153 days.

(21) Appl. No.: 10/361,147

(22) Filed: Feb. 7, 2003

(65) Prior Publication Data

US 2004/0155763 A1 Aug. 12, 2004

(51) Int. Cl.$^7$ .............................................. B60C 23/00
(52) U.S. Cl. ...................... 340/447; 340/445; 73/146.5
(58) Field of Search ................................ 340/442, 443, 340/444, 445, 446, 447, 448; 73/146.4, 146.5; 343/895, 867, 872, 700 MS

(56) References Cited

U.S. PATENT DOCUMENTS

| | | | | |
|---|---|---|---|---|
| 5,059,950 A | * | 10/1991 | Perchak | .................... 340/572.3 |
| 5,412,392 A | * | 5/1995 | Tsunekawa | .................. 343/702 |
| 5,963,181 A | * | 10/1999 | Abe | .......................... 343/895 |
| 6,161,905 A | | 12/2000 | Hac et al. | .................... 303/146 |
| 6,304,232 B1 | * | 10/2001 | Brown et al. | ............... 343/895 |
| 6,369,703 B1 | | 4/2002 | Lill | ............................ 340/447 |
| 6,388,636 B1 | * | 5/2002 | Brown et al. | ............... 343/866 |
| 6,481,806 B1 | | 11/2002 | Krueger et al. | ............. 303/140 |

* cited by examiner

*Primary Examiner*—Brent A. Swarthout
(74) *Attorney, Agent, or Firm*—Jimmy L. Funke

(57) ABSTRACT

A method and apparatus for communicating a signal from an external transmitter located in a remote location to a sensor mountable in an interior of a pressure vessel including a vehicle tire. The method and apparatus include disposing a pressure transducer assembly within the pressure vessel or tire in communication with a fluid. The transducer is operably connected to circuitry including a receiver circuit disposed on a PCB. A signal is transmitted from the external transmitter and received with an antenna disposed on the PCB operably connected with said receiver circuit. The antenna is configured as a trace coil disposed on at least two layers of the PCB with each of the trace coils being wound on a corresponding layer in an essentially spiral configuration. Each of the trace coils are on a corresponding layer being and serially connected to a contiguous trace coil disposed on a contiguous layer.

7 Claims, 6 Drawing Sheets

RF TIRE PRESSURE SIGNAL SENSOR ANTENNA AND METHOD OF PACKAGING

BACKGROUND

Motor vehicles are supported by inflatable tires having a desired inflation pressure. Improper inflation of a tire can lead to poor gas mileage and increased tire wear. Maintaining tire inflation within an acceptable range can alleviate these issues. To do so however, requires frequent measuring of tire pressure and evaluation of whether that pressure lies within an acceptable range. Moreover, tire pressure will also vary according to temperature and vehicle load.

Systems that automatically monitor pressure and provide an indication to the vehicle operator when the fluid (typically air) within the pressure vessel (e.g., the tire) reaches a condition of improper inflation typically include a pressure sensor in communication with an external receiver capable of interfacing with the vehicle operator. These systems are typically a collection of remote electronic circuits for both sensing the tire pressure and communicating the pressure information to a separate receiver, which in-turn interfaces with the vehicle operator. The actual pressure sensor may be located external to the tire, for example on or in the valve stem of the wheel. The sensor may also be located directly within the mounted wheel/tire assembly. Because these direct system sensors are located in remote areas of the vehicle, these direct systems are required to operate under their own power (e.g., battery power).

The communication link between the sensor and the external receiver may be wireless, with radio frequency signals and/or infrared or optical signals being the most common forms. Although the utility of wireless communication in these direct systems is severely limited due to reliance on battery power, these sensors can physically measure the tire pressure and transmit the tire pressure, temperature, battery level, sensor ID number, and even location information out of the rotating tire by RF signal. The direct system offers accuracy and fast response compared to systems employing an ABS wheel speed sensor to detect tire pressure. The disadvantage of the direct system is that the cost is relative high.

Because the sensor is installed inside the tire, it is not easy to physically touch the sensor in a direct system. There is a need in some instances to communicate with the sensor even though it is located within the tire, for example, to drive the sensor into a test mode, to force the sensor to transmit for the test mode, to drive the sensor into a sleep mode (to stop transmit and save battery power), to wake the sensor from sleep mode, telling the sensor it's relative location (right front or left rear), and to pass calibration parameters to the sensor, etc. A common method to talk to the sensor employs using low frequency signals, 125 kHz. For receiving the low frequency signals, a coil is used as an antenna. Because the low frequency field strength is very low, the required efficiency of the coil is relatively high resulting in a higher cost for such a coil. Current coil designs employ a surface mounted (SMD) small ferrite core coil to obtain the required efficiency. These surface mounted inductors cost in excess of $0.20 per unit in large volumes.

While employing a SMD ferrite core coil serves its antenna function, it proves to be costly and increases the componentry on the printed circuit board on which it is employed. Accordingly, a tire pressure sensing and transmit/receiving assembly having a less costly antenna to receive low frequency signals involving less componentry would be of great benefit.

SUMMARY OF THE INVENTION

Disclosed herein is a pressure transducer assembly mountable in an interior of a pressure vessel configured to receive a remote signal including a multilayer printed circuit board (PCB), a receiver circuit operably connected to said PCB, and an antenna operably connected to said receiver circuit configured to receive the external remote signal. The antenna is a trace coil disposed on at least two layers of the multilayered PCB with each of the trace coils wound on a corresponding layer in an essentially spiral configuration. Each of the trace coils are serially connected to a contiguous trace coil disposed on a contiguous layer.

Also disclosed is a method of communicating a signal from an external transmitter located in a remote location to a sensor mountable in an interior of a pressure vessel including a vehicle tire. The method includes disposing a pressure transducer assembly within the pressure vessel or tire in communication with a fluid. The transducer is operably connected to circuitry including a receiver circuit disposed on a PCB. The method further includes transmitting a signal from the external transmitter located at said remote location and receiving the signal with an antenna disposed on the PCB and operably connected with the receiver circuit. The antenna is configured as a trace coil disposed on at least two layers of the PCB with each of the trace coils being wound on a corresponding layer in an essentially spiral configuration. Each of the trace coils are on a corresponding layer serially connected to a contiguous trace coil disposed on a contiguous layer.

The above described and other features are exemplified by the following figures and detailed description.

BRIEF DESCRIPTION OF THE DRAWINGS

Referring now to the figures wherein the like elements are numbered alike.

DETAILED DESCRIPTION

Figure 1:
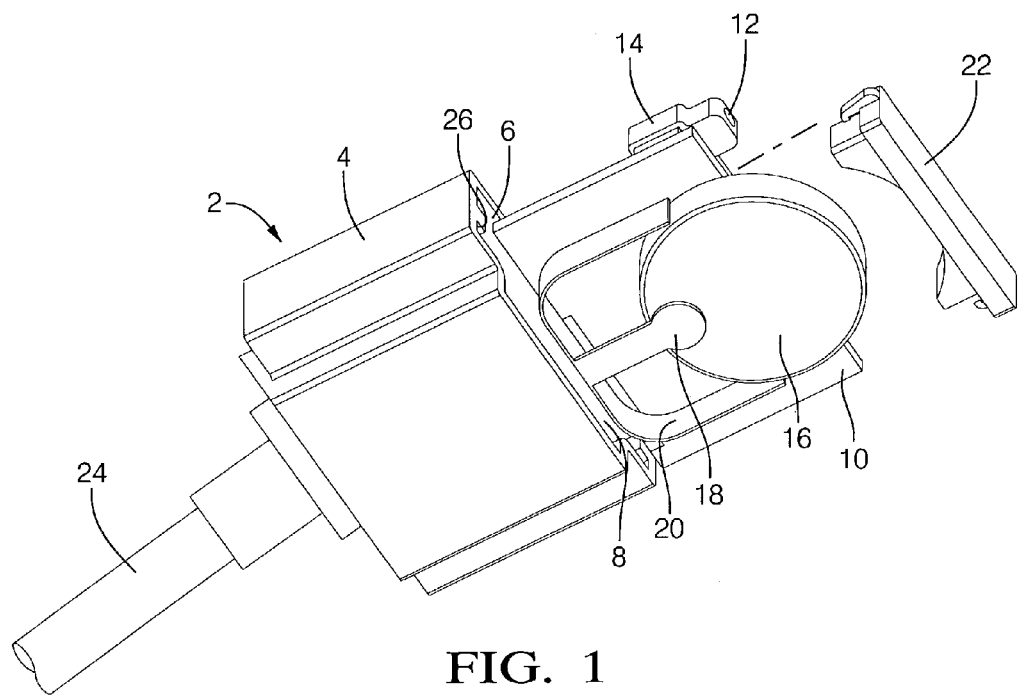
FIG. 1 is a bottom view of an expanded assembly described herein.
Figure 2:
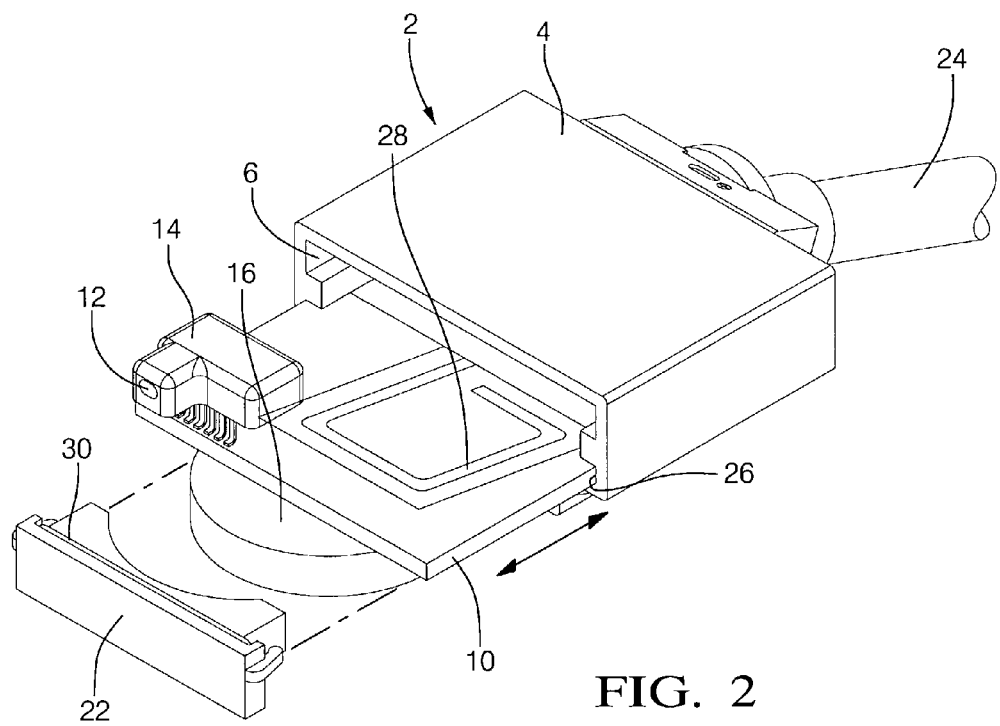
FIG. 2 is a top perspective view of an expanded assembly described herein.

The pressure sensing assembly described herein includes an assembly housing, an electronic circuitry including a pressure sensing transducer, and a means of communicating with the circuitry from an external transmitter. Power for the circuitry is provided by a portable power source, such as a battery.

Turning now to the Figures, and in particular to FIGS. 1, 2, 3, and 4, an embodiment of the pressure transducer assembly described herein is referred to generally as 2. The embodiment shown has a sensor housing 4 divided into a first compartment 6 and a second compartment 8. These compartments being separated from one another by a divider or multilayered printed circuit board (PCB) 10. Circuitry is disposed on or in contact with PCB 10, and includes a pressure transducer 12 coupled to a transceiver circuit 14 of the circuitry. The transceiver circuit includes a receiving circuit having an antenna 28, capable of receiving a signal responsive to an input generated by an external transmitter at a remote location (not shown). The power source 16 is in electrical communication with the circuitry through power supply contacts 18 and 20. A cover 22 sealably engages sensor housing 4 and PCB 10 to seal second compartment 8 wherein power source 16 is located. The Figures also depict a pressure transducer assembly 2 having a valve stem 24 attached to the sensor housing 4.

The sensor housing 4 preferably has a structural integrity capable of withstanding the forces acting upon it while in use. Preferably, housing 4 is also made from a material that is stable in the corrosive environment and at the temperatures found within an inflated tire during operation. Preferably, the sensor housing 4 is formed from a polymeric resin (e.g., plastic). Suitable polymeric resins include thermosetting resins and thermoplastic resins, which may also include fillers, antioxidants, UV absorbers, stabilizers, and the like. The preferred material of construction is glass filled nylon-66.

The sensor housing 4 is preferably formed through a process suitable for forming a housing capable of withstanding the conditions discussed above including injection molding, casting, sintering, and the like. Preferably, the sensor housing 4 is formed from injection molding.

To provide support, contact, and protection of the various components, the sensor housing 4 is divided into separate compartments by PCB 10. Preferably, PCB 10 is removable from the housing to allow for access of the various circuitries and optionally provides for replacement of power supply 16. A notch, slot and/or groove 26 is arranged, aligned, and dimensioned in the housing to allow PCB 10 to slideably engage housing 4, so forming the separate compartments.

It is important that the pressure transducer 12 be in fluid communication with the pressurized fluid in the pressure container (e.g., compressed air in the tire/wheel assembly). Preferably, first compartment 6 serves as a conduit to place the pressure transducer in fluid communication with the pressurized fluid to be measured, and also to protect the circuitry from harmful contact with foreign matter. Accordingly, first compartment 6 is open to the environment on at least one side.

Second compartment 8 is located between, and bounded by sensor housing 4 and divider PCB 10, and is arranged and dimensioned to contain the removable power source 16. Preferably, second compartment 8 is dimensioned to not only contain but also to provide support of power source 16 and thus hold it in place to remain in contact with the electronic circuitry during operation.

Figure 3:
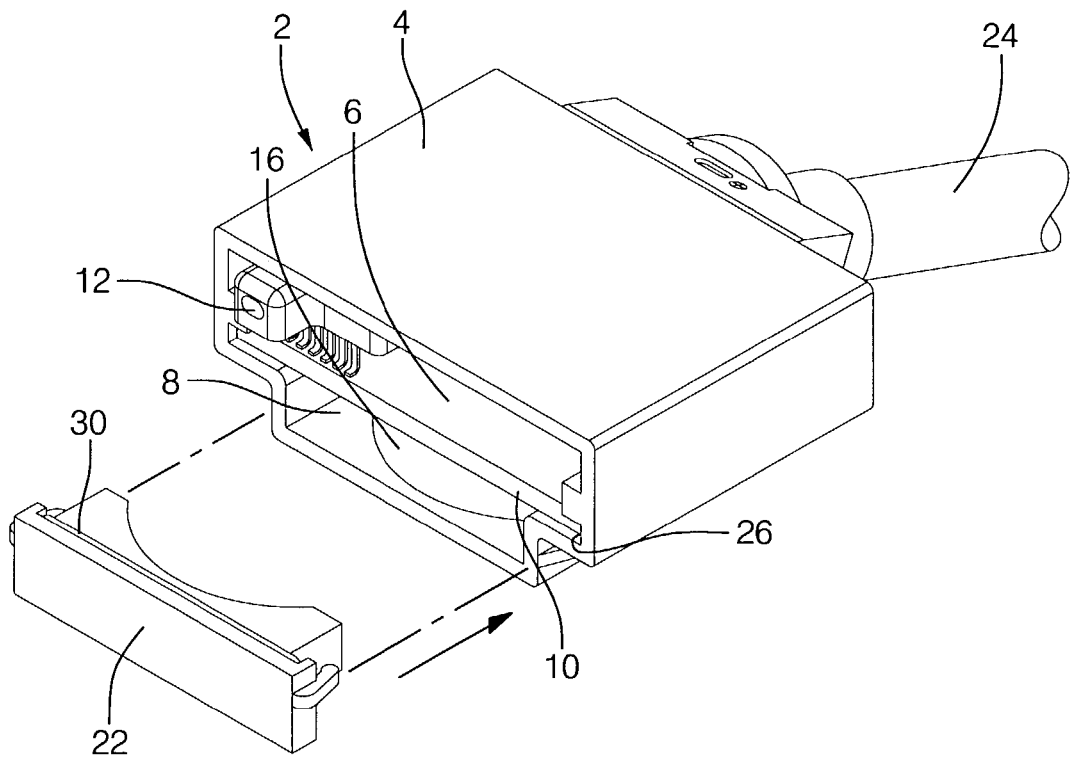
FIG. 3 is a perspective view showing an assembly described herein and the placement of a cover.
Figure 4:
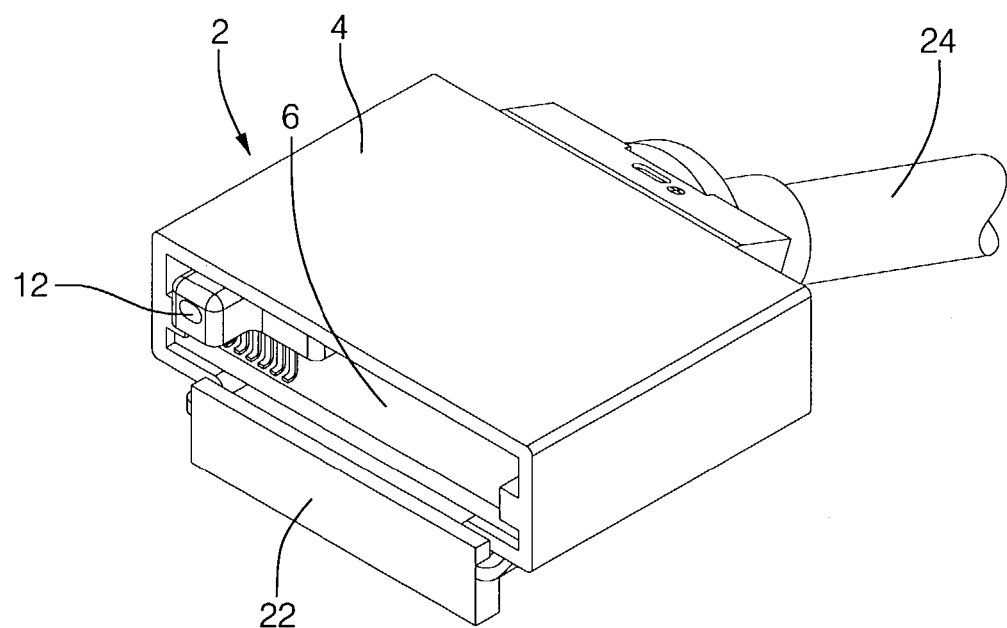
FIG. 4 is a perspective view of the completed assembly described herein.

Cover 22 completes the enclosure of power source 16 and any circuitry disposed within second compartment 8 (see FIGS. 3 and 4). Preferably, cover 22 frictionally engages sensor housing 4 and/or PCB 10 to form a closed compartment. Also preferably, cover 22 is equipped with a cover sealing member 30 which forms an essentially airtight seal within second compartment 8. Sealing of the second compartment 8 is important to protect the power source 16 and associated circuitry from corrosive materials present within the pressure container environment. Specifically, protection is sought from moisture present and other various residual materials commonly found within such pressure containers.

PCB 10 is also fitted within the sensor housing 4 such that the second compartment 8 is protected from the corrosive materials present. Preferably, PCB 10 forms an airtight seal with sensor housing 4. The PCB 10 also provides support for the circuitry, which is preferably directly attached to the PCB and/or disposed on one or more layers forming PCB 10.

Figure 7:
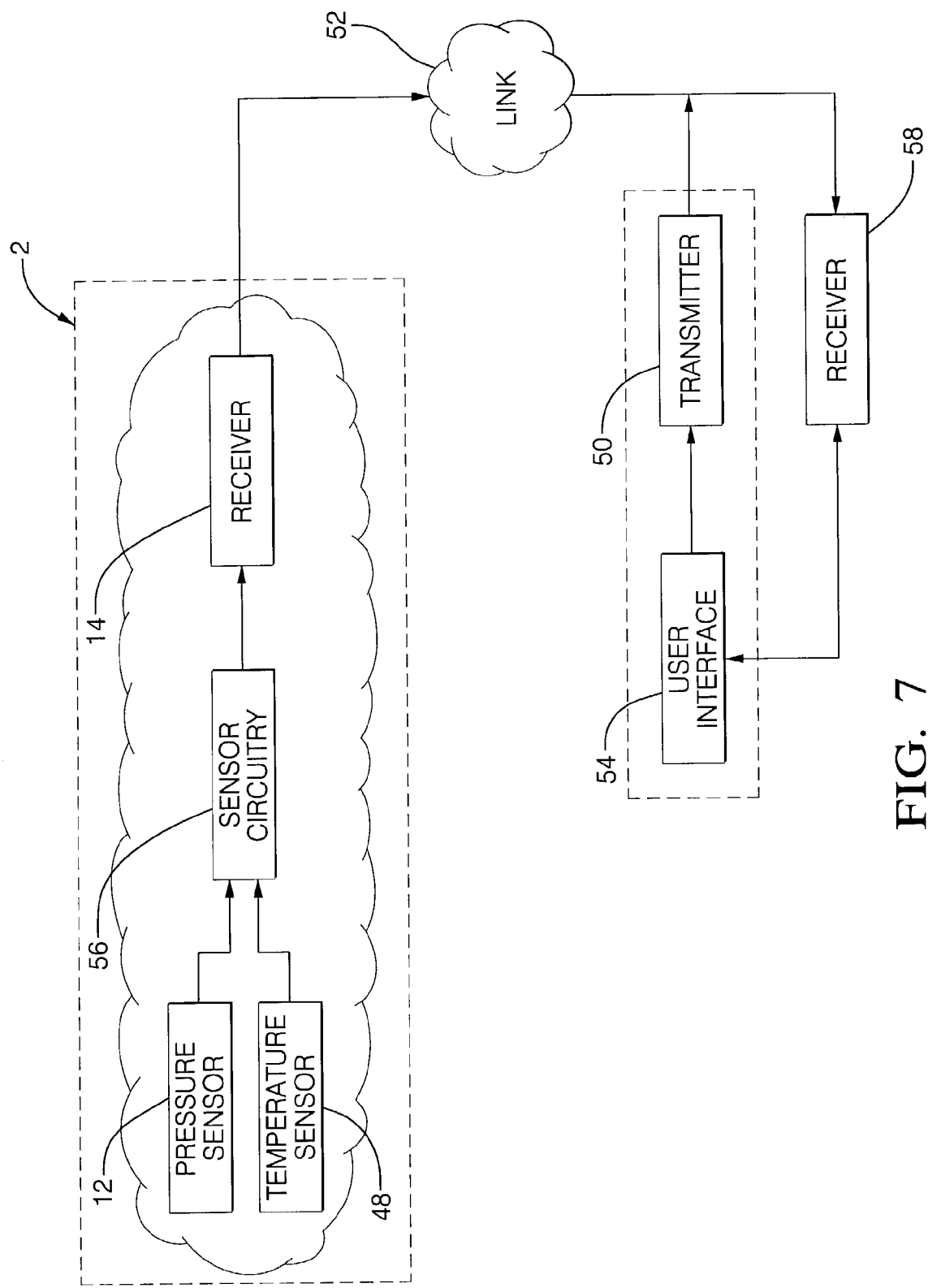
FIG. 7 shows a block diagram of a tire pressure monitoring system described herein.

The pressure transducer 12, any sensor circuitry 56, including but not limited to, a microcontroller and transmission circuitry, and reception circuitry 14 is preferably comprised of solid-state integrated circuits in electrical connection with power source 16. Also, other types of sensors and associated circuitry may be present including, for example, a temperature sensor 48 and transmitter (not shown). The transmitter is preferably in communication with a separate high frequency antenna (not shown) to facilitate communication over a wireless signal link 52 of a signal indicative of the tire internal pressure by transmitting to an outside receiver 58, which is located remote to the sensor (See FIG. 7). Preferably, the mode of communication is a digital representation (data) representative of a command over the wireless transmission link (e.g., radio frequency (RF), magnetic, ultrasonic, and/or the like). Furthermore, it is contemplated that the transmitter and optionally receiver 58 incorporated therewith is configured to process pressure data and any other sensor data to interact with the operator of the vehicle at a user interface 54. The user interface 54 then apprises the operator of the vehicle of the inflation status of the tire. The user interface is optionally configured to input signals to transmitter 50 to initiate a test mode or recalibrate a tire pressure sensor, for example.

Figure 5:
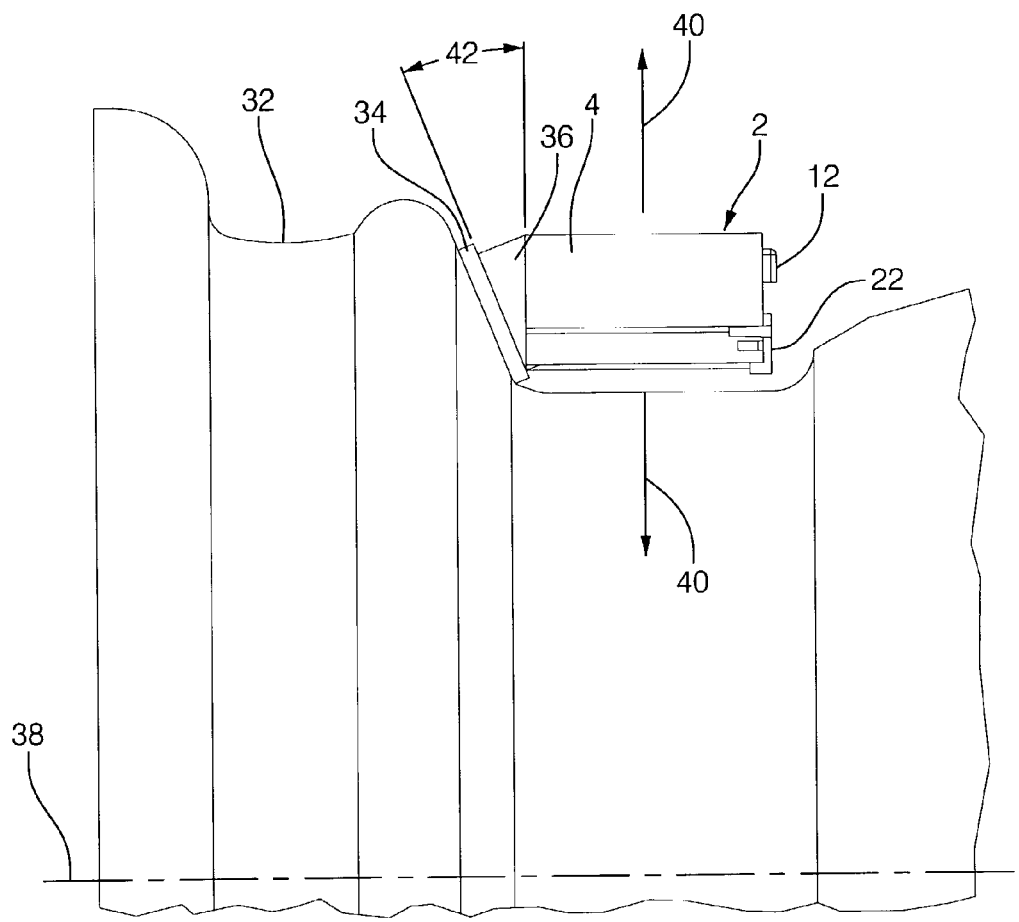
FIG. 5 is a side view of an assembly described herein mounted on a wheel.
Figure 6:
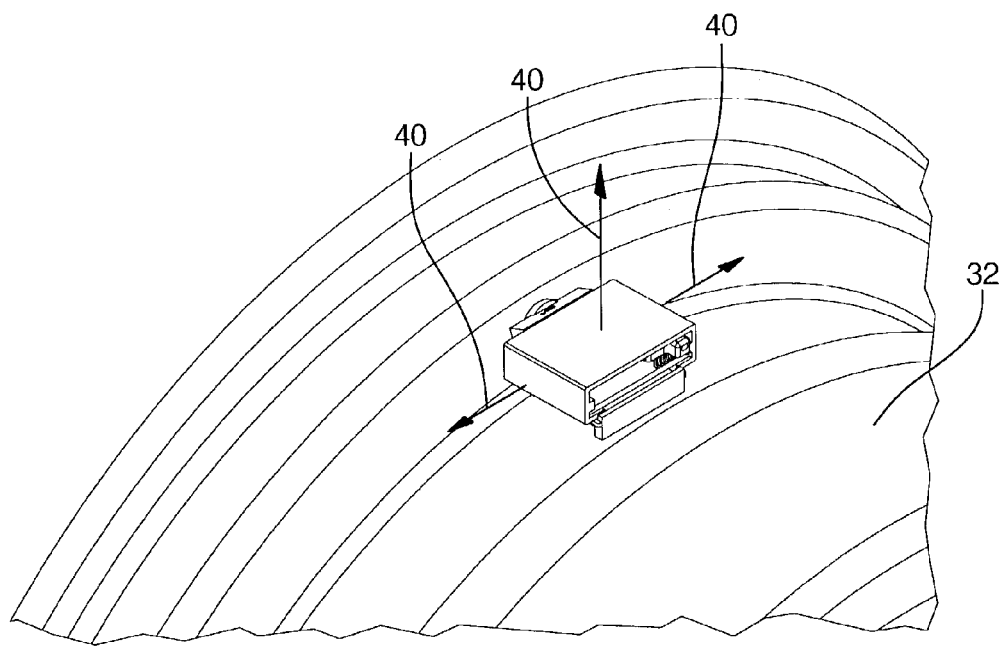
FIG. 6 is a top view of an assembly described herein mounted on a wheel.

The embodiment shown in the Figures also includes a valve stem assembly 24 joined to the pressure sensor assembly 2. The valve stem is hollow, forming a conduit therethrough. A sealing member is disposed within this conduit that is selectively movable between a closed position in which the sealing member prevents fluid flow within the conduit; and an open position in which the sealing member allows fluid to flow through the conduit. Importantly, the valve stem 24, when present, serves as an attaching means to the wheel as shown in FIGS. 5 and 6. It will also be understood that other attachment means are contemplated for attaching pressure sensor assembly 2 within a tire other than involving a corresponding valve stem assembly 24.

FIG. 5 shows pressure transducer assembly 2 assembled on a wheel 32. The valve stem assembly 24 protrudes through a hole located within wheel 32 and is preferably secured using a threaded member (not shown) such that the pressure transducer assembly 2 may be secured to, and remain in sealing contact with wheel 32 using a compression washer 34 between wheel 32 and sensor housing 4. Also shown is the orientation of the pressure transducer assembly 2 to the rotational axis 38 of wheel 32. Preferably, the sensor housing 4 has a mating surface disposed at an angle 42 complementary to the mounting angle of the wheel 32, such that a major axis of the pressure transducer assembly 2 is essentially parallel to rotational axis 38. More importantly, a major axis of the power source is parallel to this rotational axis 38 of wheel 32. This orientation prevents the forces experienced by the power source during operation (shown graphically as force lines 40) from separating the various components operably connected within the power source (e.g., the electrodes and electrolyte of the battery). In doing so, this orientation prolongs the life of the power source. The value of the angle is determined by the location of the assembly 2 on the wheel, and is readily determined by one skilled in the art. In addition, the proper angle may be accomplished by placing an angled shim or spacer between and in contact with the wheel and assembly 2 to properly position assembly 2 within the pressure container.

Figure 8:
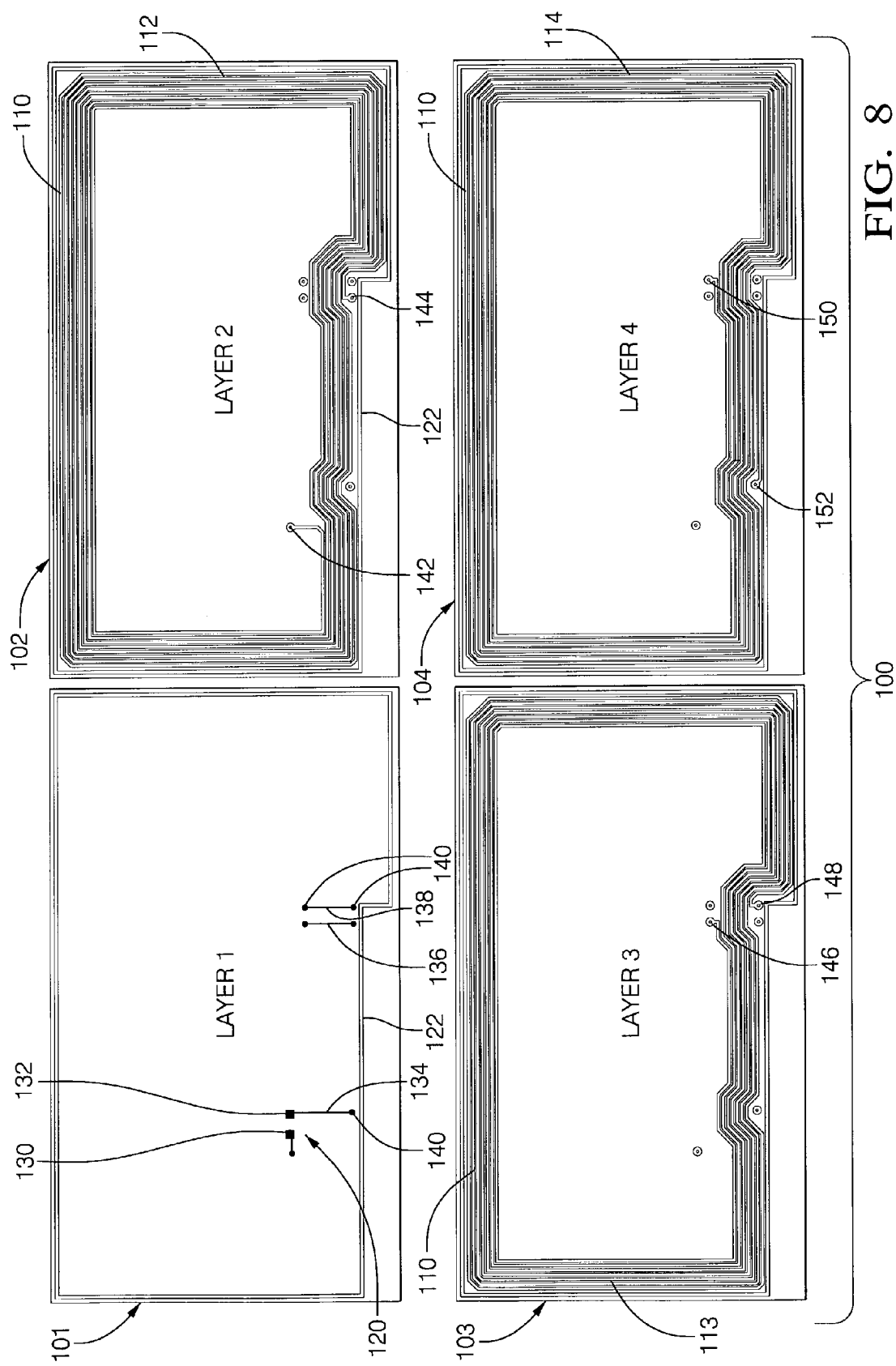
FIG. 8 illustrates an exemplary embodiment of a trace coil configuration employed in different layers of a multi-layer printed circuit board for use herein.

Referring now to FIG. 8, an exemplary embodiment of a multilayered PCB 100 illustrates four separate contiguous layers 101, 102, 103, and 104, respectively of PCB 100. PCB 100 includes, but is not limited to, a plurality of coils 110 disposed on each of the layers 102–104. The plurality of coils 110 include coils 112, 113, and 114 disposed with corresponding layers 102, 103, and 104, respectively, each of which is serially connected to a coil disposed on a contiguous layer forming the multilayered PCB 100 discussed more fully below. The circuitry disposed on PCB 100 is in electrical communication with the serially connected coils that are concentrically aligned with each other as layers 101–104 are stacked to form multilayer PCB 100. A circuit interconnection shown generally at 120 provides electrical interconnection of the coils 110 and circuitry components such as sensor circuitry 56 and transceiver circuitry 14 and may be characterized by various technologies such as hand wiring, a printed card, flexible circuit, lead frame, ceramic substrate, or other circuit connection fabrication or methodology. A preferred embodiment for the circuit assembly or interconnection 120 comprises the abovementioned elements affixed to printed circuit board circuit interconnection 120 of multiple layers.

The coils 110 are traced coils located on layers 102–104 of PCB 100 during manufacture thereof in such an orientation as to form a spiral on each layer 102–104 in close proximity to a periphery 122 defining each layer 102–104 in which coils 110 are traced. The traced coils 110 are formed using known practices in the pertinent art, such as sputtering, mechanical and chemical etching, and the like. In a preferred embodiment, the traced coils 110 are conductive and an integral part of the circuit interconnection 120. Traced coils 110 include, but are not limited to, three or more spiraling conductor coils concentrically wound in a spiral fashion proximately confined to periphery 122 such that each coil includes three windings of seven turns each on three separate layers 102, 103 and 104. Each of the windings is configured such that it spirals inward toward a center portion of each coil 112–114 in a counterclockwise fashion. Thereby, the effects of the windings' physical construction variances on the induced voltages are minimized. Further, the traced coils 112–114 are each physically arranged such that each has an equivalent effective depth on the respective layer 102–104. That is, the traced coil is spirally wound on a respective layer 102–104 such that the average distance to the bottom surfaces of layers 102–104 is maintained substantially constant. The exact configuration of the winding arrangement stated is illustrative only, many configurations being possible and within the scope of the invention. The key operative function is to maximize the size of the loops defining coils 110 to minimize the effects of multiple winding effective distances (gaps) on the induced voltages. While three seven turn windings are described, the coils need only be configured proximate an outside edge of the layers forming PCB 100 for increasing the inductance of the serially connected coil. Furthermore, to increase the Q of the serially connected coil, two or more ounces of copper is preferably used to reduce the coil resistance. Although three layers are discussed above, at least two PCB layers are contemplated having trace coils 110 thereon.

Still referring to FIG. 8, the serial connection of coils 112–114 will be described. Layer 101 forms a top layer and layer 104 forms a bottom layer. Layers 101 and 104 sandwich layers 102 and 103 therebetween. Top layer 101 includes coil terminals 130 and 132 traced in layer 101 for electrically coupling coils 110 with transceiver circuitry 14. Top layer 101 also includes three coil jumpers 134, 136, and 138. Coil jumper 134 is electrically connected to coil terminal 132 at one end and a via 140 at an opposite end. Coil jumpers 136 and 138 each have vias 140 at opposite ends thereof. Furthermore, coil terminal 130 is electrically connected to a via 140 disposed on top layer 101 for electrical connection with a corresponding aligned via 142 disposed on layer 102. Via 142 in turn is connected to coil 112 which is wound in a clockwise fashion spiraling outward toward periphery 122 defining layer 102. After winding around seven turns, coil 112 terminates at a via 144 on layer 102 in electrical connection with coil jumper 136 disposed on layer 101 employing via 140 disposed proximate periphery 122.

Coil jumper 136 electrically connects with coil 113 disposed on layer 103 employing via 140 of coil jumper 136 aligned with a via 146 on layer 103 and electrically connected to one end of coil 113. Coil 113 is wound in a clockwise fashion spiraling outward toward periphery 122 defining layer 103. After winding around seven turns, coil 113 terminates at a via 148 on layer 103 in electrical connection with coil jumper 138 disposed on layer 101 employing via 140 disposed proximate periphery 122.

Coil jumper 138 electrically connects with coil 114 disposed on layer 104 employing via 140 of coil jumper 138 aligned with a via 150 on layer 104 and electrically connected to one end of coil 114. Coil 114 is wound in a clockwise fashion spiraling outward toward periphery 122 defining layer 104. After winding around seven turns, coil 114 terminates at a via 152 on layer 104 in electrical connection with coil jumper 134 disposed on layer 101 employing via 140 disposed proximate periphery 122, which in turn is electrically coupled to coil terminal 132 completing serial connection of coils 112–114.

Figure 9:
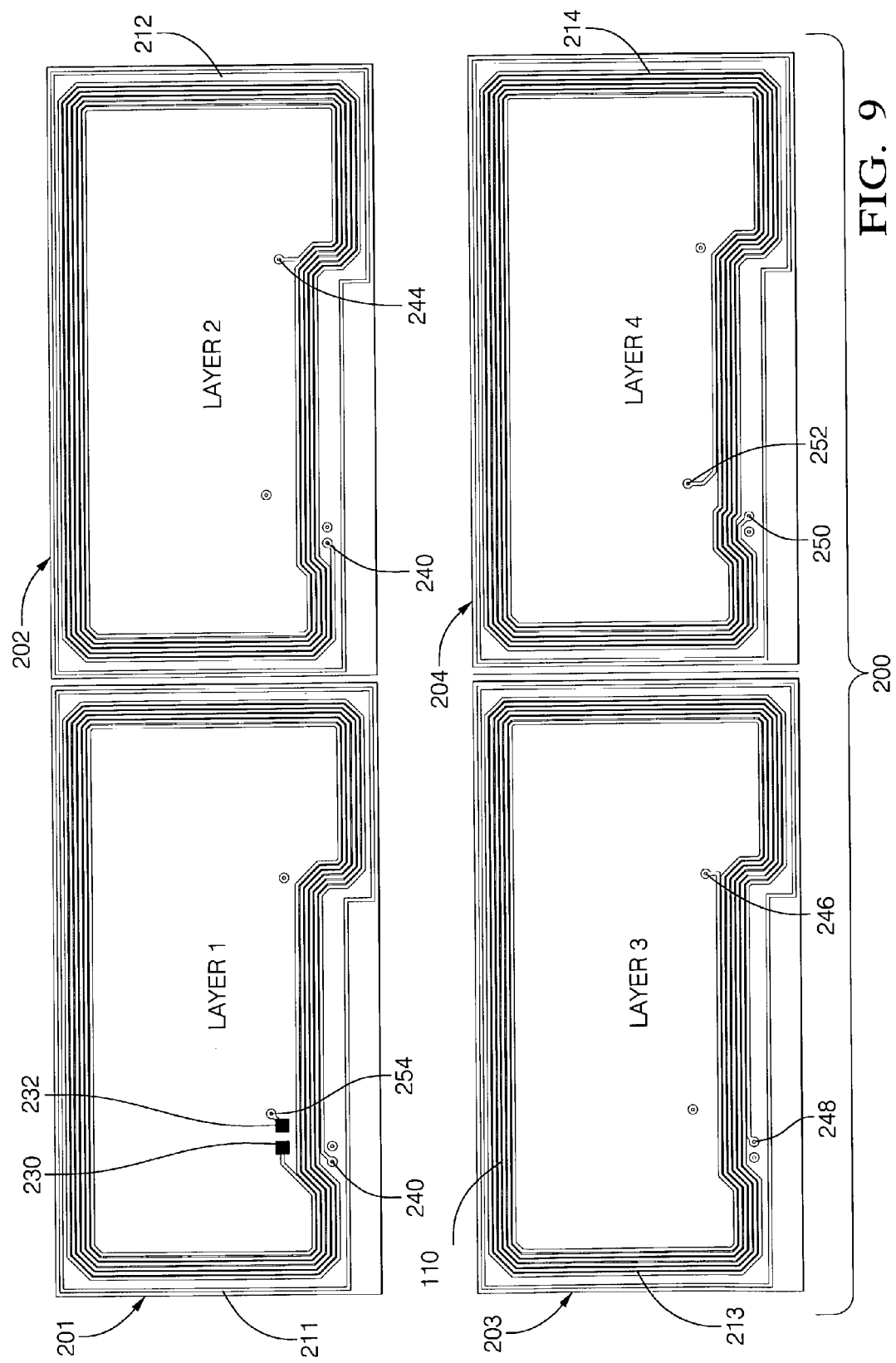
FIG. 9 illustrates another exemplary embodiment of a trace coil configuration employed in different layers of a multi-layer printed circuit board for use herein.

In another embodiment of the invention, windings may be employed on four or more layers of PCB 100. Again, the trace coils 110 are configured to optimize the size of the loops forming each coil on each layer in light of the magnetic field strength, processing employed, physical and operational constraints. One skilled in the art would recognize that the coil could be comprised of many other configurations of windings. FIG. 9 depicts one such possible embodiment.

Referring to FIG. 9, a layer 201 forms a top layer and a layer 204 forms a bottom layer. Layers 201 and 204 sandwich layers 202 and 203 therebetween forming a multilayer PCB 200. Top layer 201 includes coil terminals 230 and 232 traced in layer 201 for electrically coupling coils 210 with transceiver circuitry 14. Coil terminal 230 is electrically connected to a coil 211 of coils 210 and is wound in a clockwise fashion spiraling outward toward periphery 222 defining layer 202. After winding around seven turns, coil 211 terminates at a via 240 on layer 201 in electrical connection with corresponding aligned via 240 disposed on layer 202 proximate periphery 222.

Coil 212 electrically extends from via 240 on layer 202 is wound in a clockwise fashion spiraling inward away from periphery 222 defining layer 202. After winding around seven turns, coil 212 terminates at a via 244 on layer 202 aligned and electrically coupled with a via 246 disposed on layer 203 distal periphery 122. More specifically, vias 244 and 246 are disposed in an interior portion defined by wound trace coil 212.

Coil 213 electrically extends from via 246 on layer 203 and is wound in a clockwise fashion spiraling outward toward periphery 222 defining layer 203. After winding around seven turns, coil 213 terminates at a via 248 on layer 203 in electrical connection and aligned with a via 250 disposed on layer 204 disposed proximate periphery 222 outside a periphery defining wound coil 213.

Coil 214 electrically extends from via 250 on layer 204 and is wound in a clockwise fashion spiraling inward away from periphery 222 defining layer 204. After winding around seven turns, coil 214 terminates at a via 252 on layer 204 aligned and electrically coupled with a via 254 disposed on layer 201 distal periphery 222. More specifically, vias 252 and 254 are disposed in an interior portion defined by wound trace coils 211 and 214. Via 254 in turn is electrically coupled to coil terminal 232 completing serial connection of coils 211–214.

It will be recognized by one skilled in the pertinent art that in the above configuration disclosed with respect to FIG. 9, at least two trace coil layers on corresponding PCB layers are contemplated wherein the coil terminals are disposed within the coil traces for operably connecting to various circuitry also disposed within a perimeter defined by trace coils 110. It will also be recognized that an even number of trace coil layers are contemplated having coil terminals disposed inside the perimeter defined by the even number of trace coils 110.

By using the above described trace coils on layers of a multilayer PCB instead of a surface mounted ferrite core coil, the cost is about half by employing the traced coils on multiple layers forming the PCB. Furthermore, the failure rate is reduced by eliminating a component from the PCB (i.e., the ferrite core). The above described coil configurations provide a cost effective and reliable means to communicate with a device employing the traced coils to receive a low frequency signal such as, for example, a 125 kHz frequency signal used to communicate with a tire pressure sensor assembly disposed within a vehicle tire. For instance, an external command to put a battery powered tire pressure sensor in a sleep mode is greatly desired to save the limited battery power of the battery that is not easily accessible by its placement within the tire. However, it will be recognized that the trace coils may be employed in various other electrical devices other than tire pressure sensors to be employed as an antenna therewith.

While the invention has been described with reference to an exemplary embodiment, it will be understood that by those skilled in the art the various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pressure transducer assembly mountable in an interior of a tire for sensing a pressure of a fluid in said tire comprising:
    a sensor housing having a first compartment in fluid communication with said fluid;
    a PCB slideably engaged with and removable from said sensor housing, said PCB separating a second compartment from said first compartment;
    circuitry including a transceiver circuit disposed on said PCB and operably coupled to said pressure transducer;
    a pressure transducer operably connected to said circuitry, said pressure transducer in fluid communication with said first compartment;
    a coil antenna operably connected to said transceiver circuit, said antenna configured to receive a signal from a remote location, said antenna being a trace coil disposed on at least two layers of said multilayered printed circuit board with each said trace coil wound on a corresponding layer in an essentially spiral configuration, each said trace coil on said corresponding layer being serially connected to a contiguous trace coil disposed on a contiguous layer;
    a removable power source coupled to said circuitry contained within said second compartment; and
    a cover sealably engaged with said housing and said PCB such that said second compartment is not in fluid communication with said first compartment.

2. The assembly of claim 1, wherein said signal is via RF, optical, infrared, or a combination comprising at least one of the foregoing.

3. The assembly of claim 1, wherein each said trace coil is disposed proximate an outside edge defining said corresponding layer to increase inductance of the resulting coil antenna.

4. The assembly of claim 1, wherein each said trace coil is configured to optimize a loop size of each loop forming said spiral configuration of each said trace coil.

5. The assembly of claim 1, wherein each said coil on said corresponding layer is serially connected to said contiguous trace coil disposed on said contiguous layer by vias disposed in said corresponding layer and said contiguous layer.

6. The assembly of claim 1, wherein said serially connected trace coil is defined by two ends operably connected to two corresponding coils terminals disposed on an outboard first layer of said multilayered PCB, said coil terminals electrically coupled to said receiver circuit.

7. The assembly of claim 6, wherein a first coil terminal of said two coil terminals is connected to a via on said outboard first layer and a second coil terminal of said two coil terminals is connected to one of a first coil jumper and one end of said serially connected trace coil.

* * * * *